United States Patent [19]

Scaglia

[11] Patent Number: 4,917,427
[45] Date of Patent: Apr. 17, 1990

[54] AIR-SUCTION LIFTER

[76] Inventor: Enzo Scaglia, 21, V.le Monterosa, Milan, Italy, 20100

[21] Appl. No.: 217,416

[22] Filed: Jul. 11, 1988

[30] Foreign Application Priority Data

Aug. 6, 1987 [IT] Italy ................. 21601 A/87

[51] Int. Cl.⁴ .............................................. B66C 1/02
[52] U.S. Cl. .................................................. 294/64.1
[58] Field of Search ................. 294/64.1; 271/91, 103; 414/627

[56] References Cited

U.S. PATENT DOCUMENTS

| 1,069,705 | 8/1913 | Williams et al. ............... 294/64.1 X |
| 3,326,706 | 1/1968 | Busse ............................ 294/64.1 X |
| 4,505,505 | 3/1985 | Senaratne ......................... 294/64.1 |
| 4,728,135 | 3/1988 | Sugimura et al. .................. 294/64.1 |

FOREIGN PATENT DOCUMENTS

| 621144 | 7/1978 | U.S.S.R. ............... 294/64.1 |
| 1274988 | 12/1986 | U.S.S.R. ............... 294/64.1 |
| 1193921 | 6/1970 | United Kingdom ............... 294/64.1 |

Primary Examiner—Margaret A. Focarino
Assistant Examiner—Dean J. Kramer
Attorney, Agent, or Firm—Lerner, David, Littenberg, Krumholz & Mentlik

[57] ABSTRACT

An air suction, or vacuum, lifter for moving goods in non-rigid packaging such as sacks or the like; it consists of two air suction compartments, the smaller of which is contained within the larger one. Such chambers are open on the side which comes into contact with the package to be lifted and the lower edges of their side walls are equipped with an air-tight seal with the surface of said packages. Conduits and parts are provided for connecting, directly or indirectly, the air chambers with a source of vacuum and if necessary with each other.

20 Claims, 1 Drawing Sheet

AIR-SUCTION LIFTER

BACKGROUND OF THE INVENTION

1. Field of the Invention

The present invention concerns a air suction lifter, more precisely a lifter for moving packages by means of the suction created inside a chamber by a source of vacuum. In greater detail, the invention concerns a suction lifter specially designed to be used safely and reliably on non-rigid packaging such as cloth or paper sacks and the like.

2. Description of the Prior Art

The suction lifters known at present consist of a single suction chamber which is generally cylindrical in shape, with one open end, across which a part of the surface of the package is subject to suction and deformation. Inside the suction chamber, parallel to the open base, there is a perforated plate, or limiter. This structure bears against and retains the area of the upper face, subject to suction and deformation, of the package or sack to be moved i.e. lifted, transported or deposited. To try to conserve the high value of the low pressure inside the suction chamber after the grip on the package has been established and maintained, the lower edge of the outside walls of the suction chamber are fitted with air-tight elements e.g. seals. Once the vacuum has been established and an area of the surface of the package has been gripped, the package is moved as desired and later released by interruption of the suction.

The main drawback of the traditional lifting device as above illustrated is the ineffective seal obtained between the edge of the suction chamber and the package, especially if the package is a sack (which is so in the majority of cases).

Actually, creases or folds on the upper surface of the sack, especially in the area involved in the suction, are formed which can extend into the area in contact with the aforementioned perforated plate and pass under the airtight seal means.

In this way the folds connect the suction chamber to the outside atmosphere and drastically reduce the level of vacuum in the suction chamber. Because of said reduction, the flow rate of air snoked from the chamber has to be considerably increased to maintain the grip on the package or sack in question. Despite this, the hold on the sack remains precarious and it is often sufficient just to jolt the sack while it is suspended to alter negatively the balance between the air entering the chamber and the sucked air, thus causing the sack being lifted to fall. Further, because of the difficulties described above, the equipment required to guarantee a sufficient suction is so large that it can be moved only with great difficulty, thus detracting from the flexibility required of similar devices.

Finally, because of the stated disadvantages, different sized suction chambers are required depending on the kind of packages (sacks) to be moved.

There is then a necessity for a suction lifter which safely moves non-rigid packages, and in particular sacks of different sizes. Further, such lifter should be operated by vacuum sources that are sufficiently small to be easily moved.

SUMMARY OF THE INVENTION

Accordingly, an object of the present invention is to solve the above problems with a suction lifter which gives the maximum reliability in the movement of non-rigid packages of various size and weight, and achieves a high level of vacuum with a low suction flow rate.

Essentially, according to the invention a lifter of the suction, or vacuum, type is provided, especially for the movement of products in non-rigid packaging such as sacks or similar, characterized in that it comprises two suction chambers, one of which, being smaller, is located inside the second chamber, both chambers being open at the end which contacts the package to be moved, and being provided, on the edge of said side, with air-tight seal means on said package to be moved.

The invention will now be described in detail with reference to the enclosed drawings which are of an illustrative and not-limiting nature, and wherein:

DESCRIPTION OF THE PREFERRED EMBODIMENTS

Figure 1:
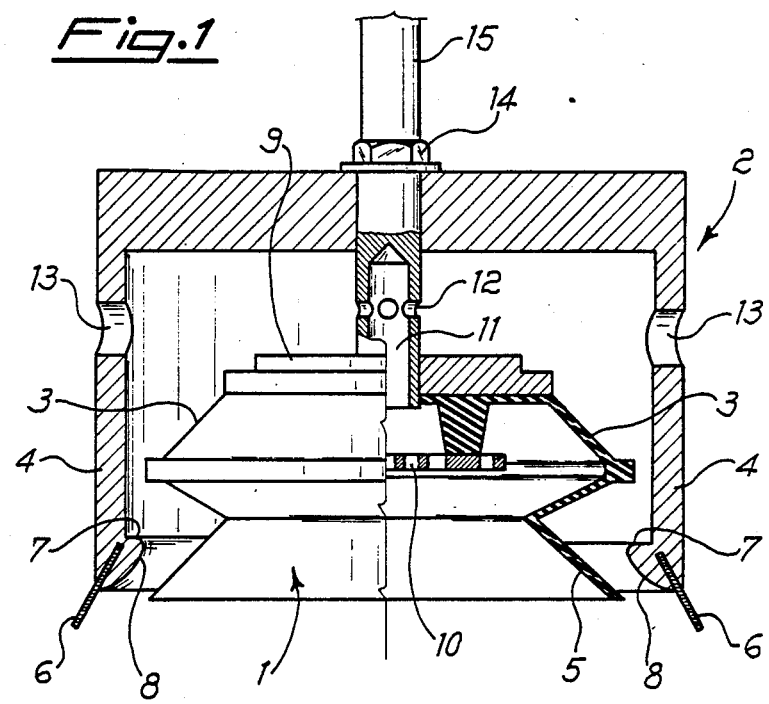
FIG. 1 is a side view, partly in section, of an embodiment of the invention.

As can be seen from FIG. 1, of which the left side is only a partial section of the embodiment shown, the suction lifter according to the invention consists essentially of two suction chamber, essentially cylindrical in shape, of which one, the internal chamber 1 is smaller and is located inside the other, or external chamber 2. Both said chambers are open on their lower base, that which comes into contact with the sack to be moved. Along the edge of this base, i.e. on the lower edges of the side walls 3 and 4 of the chambers 1 and 2 respectively, are air-tight seal means on the sack to be moved.

On the internal chamber 1 this air-tight seal means consists of the lower rim of a retractable bellows 5, e.g. of rubber, which forms at least part of the side wall 3 of said internal chamber 1. On the external chamber 2 said air-tight seal means consists of a flange 7 on the inner surface of the side wall 4, directed towards the inside of the chamber 2 and connected to the lower edge of the side wall 4 by the curved rim 8. On the lower edge of the side wall 4 of the chamber 2 there is also, projecting downwards and outwards from the same edge, an air-tight seal 6.

The function and object of this sealing means will be described below with reference to FIG. 2.

Continuing with the description of the embodiment of FIG. 1, it will be noted that the side wall 3 of the internal chamber 1 is mounted on a supporting base 9, to which is in its turn fixed, at a certain distance from the supporting base 9, a perforated plate 10.

Th base 9 is fixed to a tubular support 15, to which the external chamber 2 is also fixed; this support 15 contains a hollow part 11 which, by means of orifices 12, connects the internal chamber 1 with the external chamber 2. The support 15 is fitted to any already known lifting and transporting device, which provides, on command, for the depressurization of chambers 1 and 2, the balancing of the load and the control of the movements, returning the pressure in chambers 1 and 2 to atmospheric when the load has to be released.

Some holes 13 connect the external chamber 2 to a source of vacuum (not shown), e.g. a mechanical vacuum pump, by means of the lifting and transporting device. In the configuration described above, chambers 1 and 2 are interconnected by the hollow part 11 of support 15 and the orifices 12, so that the source of vacuum is connected directly to the external chamber 2 alone. Other embodiments are possible in which chamber 1 is connected directly to the source of vacuum (in that case the holes 13 would be absent) or in which the two chambers 1 and 2 are not interconnected but each is connected directly to a source of vacuum.

The wall 3 and the related bellows 5 extend from said base 9 around the perforated plate 10, to reach about the same level as the lower edge of the side walls 4 of the external chamber 2, i.e. the level of said inner curving linking edge 8. In any case, the position of the side walls 3 and the entire inner chamber 1 can be adjusted for height by acting or support 15 and lock-nut 14.

During operation, after setting the height of chamber 1 in relation to chamber 2, the holes 13 are connected to said source of vacuum and the whole lifting device is lowered onto the sack to be raised and repositioned, i.e. to be moved.

Figure 2:
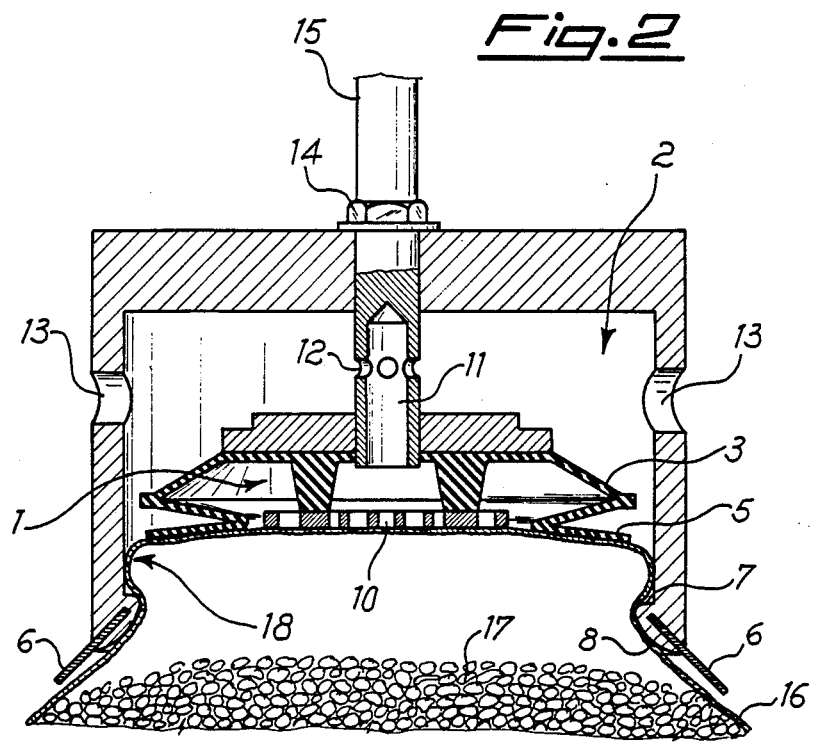
FIG. 2 is a side view in section of the same embodiment as FIG. 1 while moving a package.

As can better be shown in FIG. 2, the upper wall 16 of the sack involved in the suction comes into contact first with the seals 6 and then with the bellows 5 and the inward flange 7 and its related edge 8. The seals 6 form the first seal, due to which the upper wall 16 of the sack (which is shown only in part) is sucked towards the inside of the lifter and away from the contents 17.

Following this suction, the part of the walls 16 of the sack comes into contact with the bellows 5 and with the chamber 1, whose suction in turn brings it to the perforated plate, or limiter, 10. During this phase, the bellows retracts as the upper wall 16 of the sack moves towards the plate 10, until it assumes the position shown in FIG. 2, where the bellows 5 is almost at the level of the plate 10.

The wall 16, once drawn by the chamber 1 to the level of the plate 10, is no longer in contact with the seals 6, but assumes the position shown in FIG. 2, where it can be seen to adhere to the curved inner face 8 of the flange 7. Between the flange 7 and the perforated plate 10 the wall 16 assumes a curved shape forming a "belly" 18 due to the suction of chamber 2.

The combined action of these three effects, i.e. the suction in the internal chamber 1, the suction in the external chamber 2 and the action of flange 7 which forms the belly 18, avoids the formation of the previously mentioned creases in the wall 16 of the sack to be moved. In this way, the air-tight seal of the sealing elements 5, 7 and 8 allows to reach a vacuum level much superior to that obtained with traditional devices (i.e. the pressure in chambers 1 and 2 is lower) and this causes both a better, safer grip of the liter on the sack to be moved, and a considerably reduced suction flow rate, when compared with that previously required, thus making possible the use of smaller vacuum pumps which could easily be mobile, i.e. on a trolley, as well as being capable of being used for various sized sacks.

I claim:

1. An air suction device for lifting packages of goods having non-rigid walls, said air suction device comprising,
  a. a suction chamber having substantially rigid walls to define a chamber interior and a chamber opening, said suction chamber having chamber seal means about said chamber opening for sealing in a substantially air-tight manner the suction chamber on a non-rigid wall of a package, said chamber interior being connectible to a vacuum source such that there is a first suction force at said chamber opening, whereby said suction chamber is capable of pulling the non-rigid wall of the package away from the packaged goods; and
  b. a suction cup disposed within said suction chamber, said suction cup having a cup interior and a cup opening, said cup opening being in the region of said chamber opening, said suction cup having cup seal means about said cup opening for sealing in a substantially air-tight manner the suction cup on the non-rigid wall of the package, said cup interior being connectible to a vacuum source such that there is a second suction force at said cup opening, whereby said suction cup is capable of pulling the non-rigid wall of the package further away from the packaged goods than said suction chamber alone, said first and second suction forces being present simultaneously throughout the lifting of the packaged goods.

2. The air suction device in claim 1, wherein said chamber walls include an integral chamber flange abaout said chamber opening to form at least a part of said chamber seal means, said chamber flange being directed inwardly towards said chamber interior to form an interior shoulder on said chamber walls and having a convex surface about said chamber opening, said interior shoulder facilitating the pulling of the non-rigid wall of the package away from the packaged goods.

3. The air suction device in claim 2 wherein said chamber seal means further includes a flexible flange about said chamber opening, said flexible flange being directed outwardly and downwardly below said flange of said chamber walls.

4. The air suction device in claim 1, wherein said suction cup is in the form of a retractable bellows having flexible and freely disposed side wall suctions.

5. The air suction device in claim 4, wherein said retractable bellows includes a lower edge which forms at least a part of said cup seal means.

6. The air suction device in claim 5, including a conduit between said chamber interior and said cup interior so that said chamber interior and said cup interior are in vacuum communication, and a perforated suction plate connected to said conduit, and wherein said retractable bellows are disposed around and below said perforated suction plate.

7. The air suction device in claim 6, wherein said retractable bellows have a free lower edge, and said retractable bellows is moveable between an extended position in which said lower edge is adjacent to the bottom of said chamber walls, and a retracted position in which said lower edge is adjacent said perforated suction plate so that the non-rigid wall of the package can contact said perforated suction plate.

8. The air suction device in claim 6, wherein said perforated suction plate is moveable so that its position within said cup interior can be adjusted for lifting different packages of goods.

9. The air suction device in claim 4, wherein said suction cup is moveable within said suction chamber so that said suction cup can be adjusted for lifting different packages of goods.

10. The air suction device in claim 1, wherein said chamber interior and said cup interior are connectible to the same vacuum source.

11. The air suction device in claim 10, wherein said chamber interior and said cup interior are in vacuum communication with one another, and said chamber interior is connectible to the single vacuum source.

12. The air suction device in claim 1, wherein said chamber interior is connectible to a first vacuum source end said cup interior is connectible to a second vacuum source.

13. The air suction device in claim 2, wherein said suction cup is in the form of a retractable bellows having flexible and freely disposed side wall sections.

14. The air suction device in claim 13, including a conduit between said chamber interior and said cup interior so that said chamber interior and said cup interior are in vacuum communication, and a perforated suction plate connected to said conduit, and wherein said retractable bellows are disposed around and below said perforated suction plate.

15. The air suction device in claim 14, wherein said retractable bellows have a free lower edge, and said retractable bellows is moveable between an extended position in which said lower edge is adjacent to the bottom of said chamber walls, and a retracted position in which said lower edge is adjacent said perforated suction plate so that the non-rigid wall of the package can contact said perforated suction plate.

16. The air suction device in claim 14, wherein said perforated suction plate is moveable so that its position within said cup interior can be adjusted for lifting different packages of goods.

17. The air suction device in claim 10, wherein said suction cup is in the form of a retractable bellows having flexible and freely disposed side wall sections.

18. The air suction device in claim 17, including a conduit between said chamber interior and said cup interior so that said chamber interior and said cup interior are in vacuum communication, and a perforated suction plate connected to said conduit, and wherein said retractable bellows are disposed around and below said perforated suction plate.

19. The air suction device in claim 18, wherein said retractable bellows have a free lower edge, and said retractable bellows is moveable between an extended position in which said lower edge is adjacent to the bottom of said chamber walls, and a retracted position in which said lower edge is adjacent said perforated suction plate so that the non-rigid wall of the package can contact said perforated suction plate.

20. The air suction device in claim 19, wherein said perforated suction plate is moveable so that its position within said cup interior can be adjusted for lifting different packages of goods.

* * * * *

UNITED STATES PATENT AND TRADEMARK OFFICE
CERTIFICATE OF CORRECTION

PATENT NO. : 4,917,427

DATED : April 17, 1990

INVENTOR(S) : Enzo Scaglia

It is certified that error appears in the above-identified patent and that said Letters Patent is hereby corrected as shown below:

Abstract page, line 10, "parts" should read --ports--.
Column 3, line 51, "liter" should read --lifter--.
Column 4, line 20, "abaout" should read --about--.
Column 4, line 35, "suctions" should read --sections--.
Column 5, line 3, "end" should read --and--.

Signed and Sealed this

Eleventh Day of February, 1992

Attest:

HARRY F. MANBECK, JR.

*Attesting Officer*      Commissioner of Patents and Trademarks